United States Patent [19]
Harms et al.

[11] Patent Number: 6,017,446
[45] Date of Patent: Jan. 25, 2000

[54] FLOOR MOUNTED FILTRATION SYSTEM

[75] Inventors: Eugene H. Harms, Perrysburg; Stephen N. McEwen, Bowling Green; Michael C. Harms, Perrysburg; John L. Creps, Rudolph, all of Ohio

[73] Assignee: Henry Filters, Inc., Bowling Green, Ohio

[21] Appl. No.: 09/131,145

[22] Filed: Aug. 7, 1998

[51] Int. Cl.[7] .......................... B01D 35/00; B01D 35/28; B23Q 11/00
[52] U.S. Cl. .......................... 210/168; 210/154; 210/162; 210/196; 210/416.5; 210/194; 405/119; 406/171; 406/198; 184/6.14; 184/6.24
[58] Field of Search .................... 210/168, 154, 210/194, 162, 416.5, 196; 405/118, 119; 406/171, 172, 198; 184/6.14, 6.24

[56] References Cited

U.S. PATENT DOCUMENTS

| | | |
|---|---|---|
| 1,821,119 | 9/1931 | Sorenson . |
| 2,652,737 | 9/1953 | Longstreet . |
| 3,618,707 | 11/1971 | Sluhan . |
| 4,242,829 | 1/1981 | Arnstrom et al. . |
| 4,257,716 | 3/1981 | Woodrow . |
| 4,304,105 | 12/1981 | West . |
| 4,553,356 | 11/1985 | Pepper . |
| 4,655,940 | 4/1987 | Harms . |
| 4,667,351 | 5/1987 | Williams . |
| 4,715,964 | 12/1987 | Harms . |
| 4,761,226 | 8/1988 | Creps . |
| 5,067,675 | 11/1991 | Brant . |
| 5,086,795 | 2/1992 | Harms . |
| 5,098,045 | 3/1992 | Pepper . |
| 5,300,220 | 4/1994 | McEwen . |
| 5,315,880 | 5/1994 | Bailey . |
| 5,380,446 | 1/1995 | Bratten . |
| 5,662,812 | 9/1997 | McEwen . |

*Primary Examiner*—Thomas M. Lithgow
*Attorney, Agent, or Firm*—Howard & Howard

[57] ABSTRACT

A flume system for use with a floor mounted filtration apparatus and a floor mounted in-line machine section is provided. The machine section receives a flow of clean coolant from the filtration apparatus and has a series of machine outlets for outputting dirty coolant carrying particulate generated by the machine section. The system includes an elongated floor mounted flume disposed adjacent the series of machine outlets to receive the machine outputted dirty coolant. The flume has a slope of less than 2% and is coupled at an outlet end to the filtration apparatus. A discharge pipe is mounted adjacent a distal end of the flume for introducing a stream of coolant into the flume in a direction generally toward the outlet end. The stream of coolant introduced into the flume causes the flume to have an efficient hydraulic radius such that a minimal amount of coolant flows within the flume at a sufficient velocity to wash away the particulate from the flume into the filtration apparatus.

35 Claims, 3 Drawing Sheets

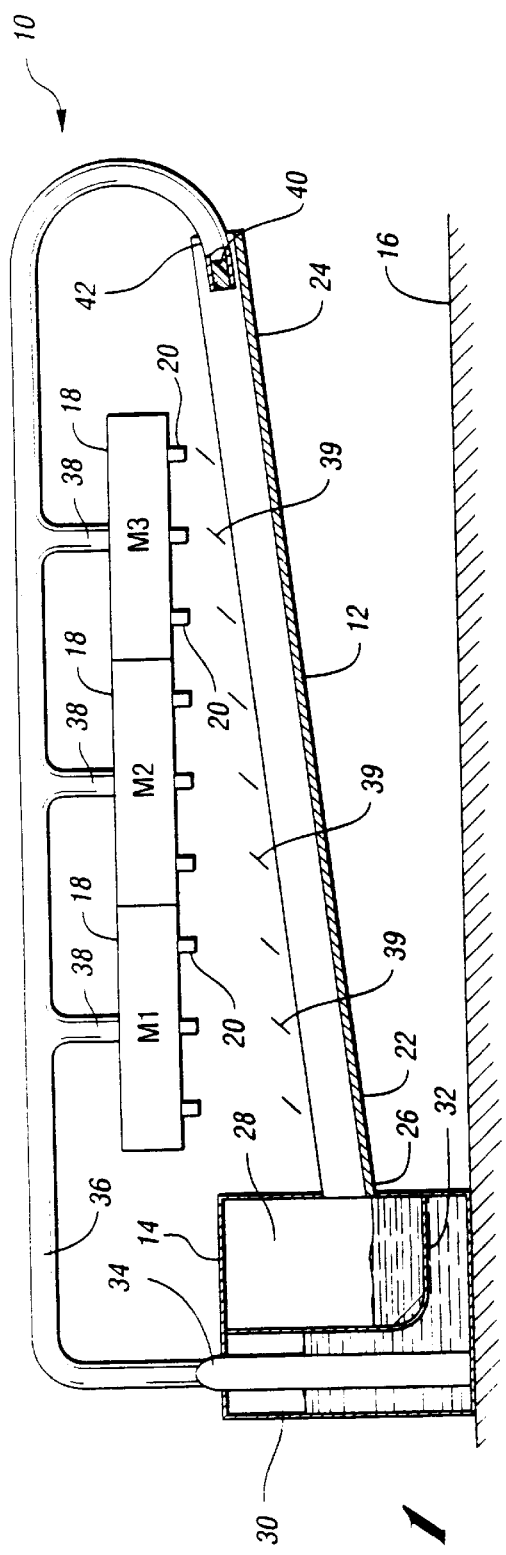
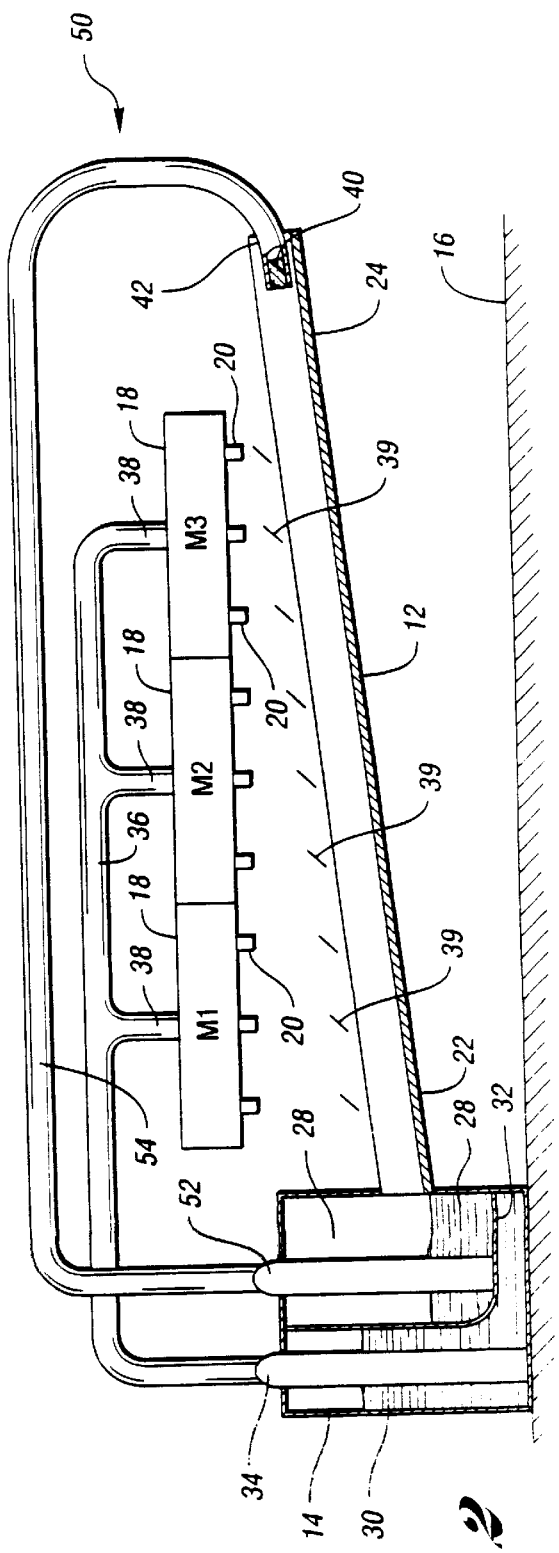
Fig. 1
Fig. 2

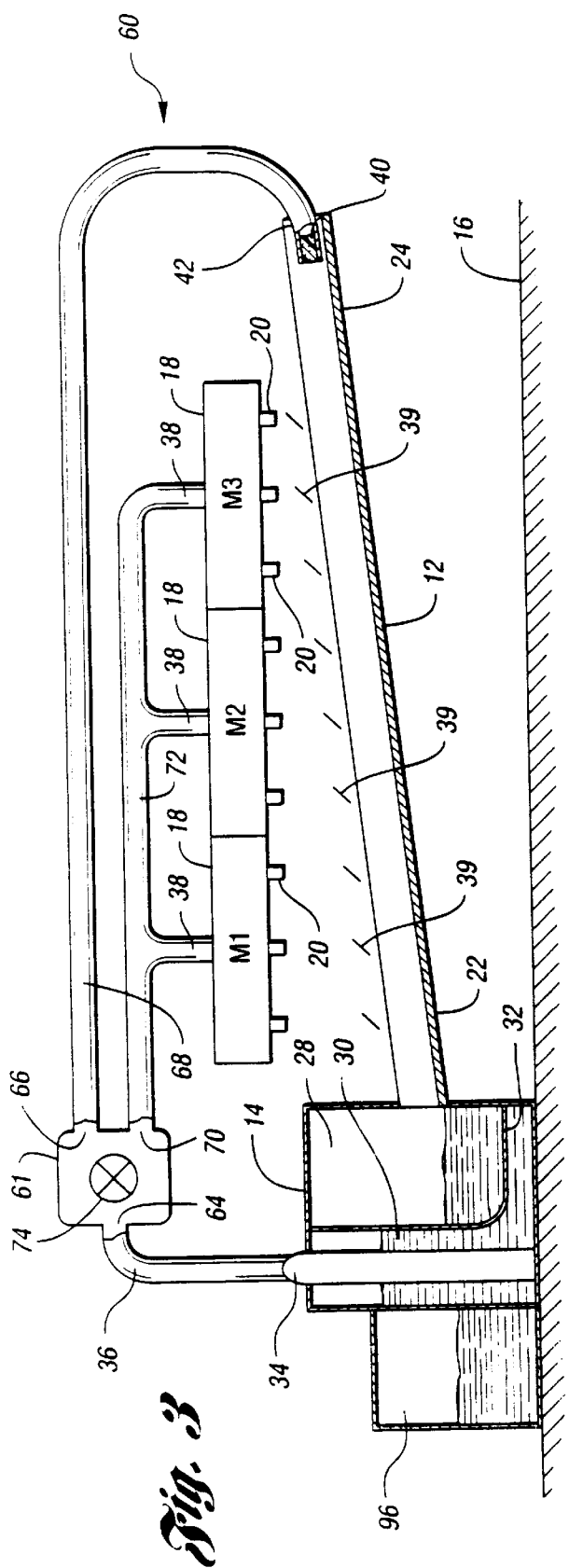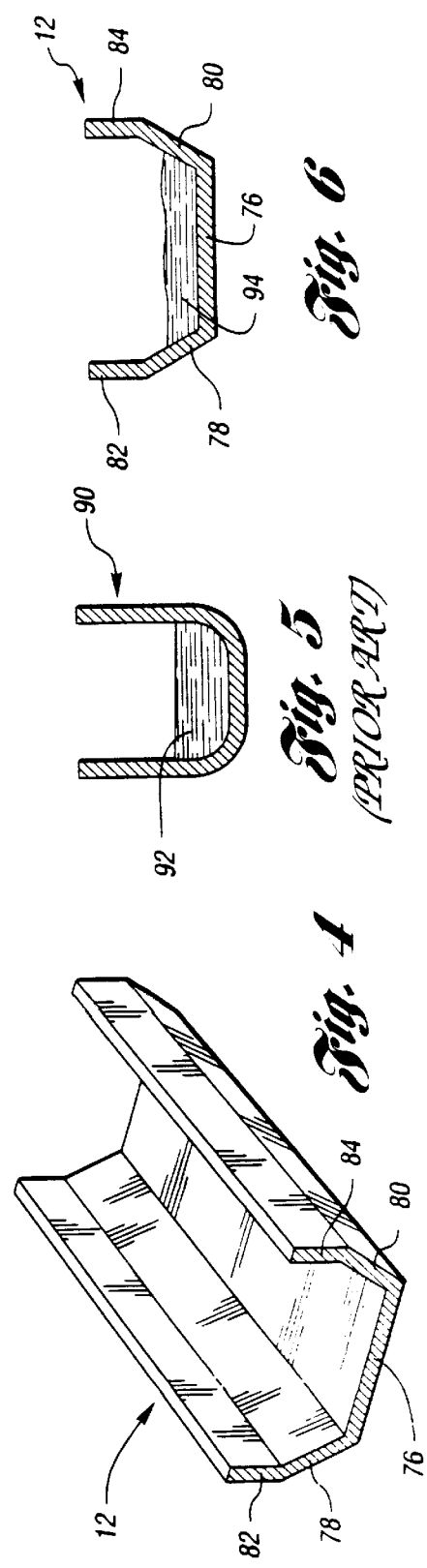

FLOOR MOUNTED FILTRATION SYSTEM

TECHNICAL FIELD

The present invention relates generally to industrial filtering systems and, more particularly, to floor mounted filtration systems employing flumes for carrying away coolant.

BACKGROUND ART

In typical machining operations, coolant must be supplied to machine sections during machining of parts to cool the sections and flush waste such as particulate away. Without coolant, tools in the sections would quickly break down and become dull from overheating or from a build up of waste. The sections output dirty coolant containing the particulate into a flume. The flume is generally disposed underneath the sections so that the dirty coolant falls into the flume. The flume typically has a slope and an outlet end connected to a filtration apparatus or sump so that the dirty coolant flowing within the flume flows to the filtration apparatus. The filtration apparatus cleans the dirty coolant by filtering out the particulate which is then discarded or recycled. A pump then pumps clean coolant from the filtration apparatus to the sections and the coolant recirculation process continues.

Problems with the coolant recirculation process surface when the particulate builds up in the flume. For steady state operation the particulate needs to be removed from the flume at a rate faster than it builds up or else, at some point, the coolant in the flume overflows. Build up of particulate in the flume may be caused by inadequate flow velocity of the coolant flowing within the flume. For instance, if the particulate is iron, which has a relatively large specific gravity, then a higher flow velocity is required to wash it away. In contrast, if the particulate is aluminum, which has a relatively low specific gravity, then a lower flow velocity is required to wash it away.

In a typical system, many sections are grouped together and the flume can become very long. A flume length of 200 to 400 feet is common. These flumes, as a result of their slope, become as deep as six to twelve feet. Consequently, the flumes must be cut into the floor supporting the sections to properly fit underneath the sections. Usually, the floor is made of concrete and the flumes are embedded therein.

A flume system having a below floor mounted flume as described above presents many disadvantages. First, it is expensive to dig and excavate. Second, the filtration apparatus is installed underground in a pit which is very costly. Another approach is for a pump to pump the dirty coolant from the outlet end of the flume up to an above ground filtration apparatus. This is disadvantageous because the pump pumps both coolant and particulate. The particulate can plug or result in accelerated wear to the pump. Thus, expensive vortexing type or self-priming trash pumps are needed. These pumps are extremely inefficient having an efficiency in the range of 50% to 60%. The pumps also require that maintenance be performed frequently due to pumping of the particulate.

Above floor mounted conveyorized troughs have been installed within sections. Conveyors rest on the bottom of the trough and push particulate towards the filtration apparatus. A disadvantage with conveyors is that they obstruct the flow of coolant in the trough and, consequently, the coolant can back up and flood the floor. Additional trash pumps have been installed part way down the length of the trough to overcome this problem. Conveyors are also high maintenance and difficult to service under the sections. To keep the coolant from splashing out of the trough and to keep the mist down, the sections and the trough are covered. Consequently, the conveyors are inaccessible.

SUMMARY OF THE INVENTION

Accordingly, it is an object of the present invention to provide an above ground floor mounted flume.

It is another object of the present invention to provide an above ground floor mounted flume flowing into an above ground floor mounted filtration apparatus which can accommodate at least one section of a group of in-line machines.

It is a further object of the present invention to provide a flume having a very shallow slope on the order of less than 2%.

It is yet another object of the present invention to provide a flume which can be mounted within a typical machine section, but shallow enough to be mounted above the floor, and within an available cavity of the machine section.

It is still yet another object of the present invention to provide a flume which permits an efficient hydraulic radius such that a minimal amount of coolant flowing within the flume may flow at a sufficient velocity for washing away the particulate from the flume even though the slope of the flume is on the order of less than 2%.

It is still yet a further object of the present invention to provide a flume which permits an efficient hydraulic radius such that losses from friction in the flume are minimized.

In carrying out the above objects, the present invention provides a flume system for use with a floor mounted filtration apparatus and a floor mounted in-line machine section. The machine section receives a flow of clean coolant from the filtration apparatus and has a series of machine outlets for outputting dirty coolant carrying particulate generated by the machine section. The system includes an elongated flume having an outlet end and a distal end. The distal end is spaced transversely from and oriented above the outlet end so that the flume has a slope of less than 2%. The outlet end is coupled to an inlet end of the filtration apparatus. The flume is mounted above the floor and disposed adjacent the series of machine outlets to receive the dirty coolant carrying the particulate.

A discharge pipe is mounted adjacent the distal end of the flume for introducing a stream of coolant into the flume in a direction generally toward the outlet end. The stream of coolant introduced into the flume causes the flume to have an efficient hydraulic radius such that a minimal amount of coolant flows within the flume at a sufficient velocity to wash away the particulate from the flume into the filtration apparatus.

A portion of the flow of clean coolant to the machine may be periodically diverted to the discharge pipe for introducing the stream of coolant into the flume. In this arrangement, the stream of coolant introduced into the flume increases the velocity of the coolant flowing within the flume to the sufficient velocity and increases the hydraulic radius to the efficient hydraulic radius.

Alternatively, the discharge pipe may continuously receive a flow of coolant from the filtration apparatus for introducing the stream of coolant into the flume. The flow of coolant from the filtration apparatus to the discharge pipe may either be filtered or unfiltered. In this arrangement, the stream of coolant introduced into the flume maintains the velocity of the coolant flowing within the flume at the sufficient velocity and maintains the hydraulic radius at the efficient hydraulic radius.

The flume may have a flat or rounded bottom. Opposed wall portions are connected to the bottom. The bottom and the wall portions form a shape conducive for permitting the efficient hydraulic radius so that the velocity of coolant flowing within the flume increases to or is maintained at the sufficient velocity when the stream of coolant is introduced into the flume. The flat bottom flume is a modified flat flume which closely approximates a round bottom flume.

The advantages accruing to the present invention are numerous. First, if installed in an existing building, the floor does not need to be cut to put the flume underneath the machine sections. Second, in new constructions, extensive excavation is not required for installation of a pit for the flume and filtration apparatus. Third, the stability and integrity of the machine sections are ensured as both sides of the sections can be mounted on solid, continuous concrete. With typical below floor mounted flumes, the machine sections lie over an opening in the floor. Fourth, the energy spent by the filtration apparatus and the pump for supplying clean coolant to the machine sections is minimized because the sections and the apparatus are mounted on the same level, when a sump is not involved.

Furthermore, the flume of the present invention may be mounted below the floor if desired. In this case, the foundation can be much shallower than standard because the slope of the flume is on the order of less than 2%.

These and other features, aspects, and embodiments of the present invention will become better understood with regard to the following description, appended claims, and accompanying drawings.

BRIEF DESCRIPTION OF THE DRAWINGS

FIG. 1 is a schematic illustration of an embodiment of the filtration system of the present invention;

FIG. 2 is a schematic illustration of another embodiment of the filtration system;

FIG. 3 is a schematic illustration of yet another embodiment of the filtration system;

FIG. 4 is a cross-sectional view of a flume employed in the filtration systems;

FIG. 5 is a cross-sectional view of a prior art flume in which the particulate carried by dirty coolant accumulates;

FIG. 6 is a cross-sectional view of the flume employed in the filtration systems in which the particulate carried by dirty coolant disperses;

BEST MODES FOR CARRYING OUT THE INVENTION

Figure 7:
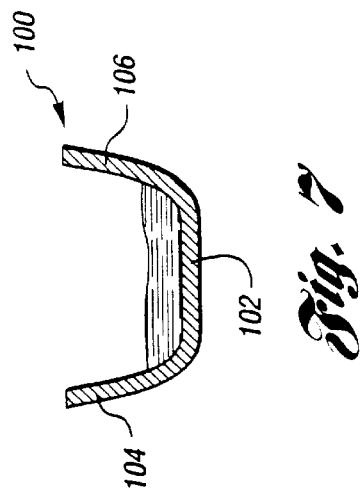
FIG. 7 is a cross-sectional view of another flume employed in the filtration systems in which the particulate carried by dirty coolant disperses.

A filtration system 10 is shown in FIG. 1. Filtration system 10 includes an elongated flume 12 and a floor mounted filtration apparatus 14. Flume 12 is mounted above a floor 16 and disposed underneath floor mounted in-line machine sections 18. Machine sections 18 have a series of machine outlets 20 for outputting dirty coolant carrying particulate generated by the sections. The dirty coolant falls from the machine outlets 20 into flume 12.

Flume 12 has an outlet end 22 and a distal end 24. Outlet end 22 is coupled to an inlet end 26. Distal end 24 is spaced transversely from and oriented above outlet end 22 so that flume 12 has a slope on the order of less than 2%. The slope causes the dirty coolant in flume 12 to flow from distal end 24 to outlet end 22 and then into filtration apparatus 14.

Accordingly, flume 12 may be readily installed on a factory floor underneath machine sections 18 even if the length of the flume is large, for instance 70 feet. With a length of 70 feet, the drop off from distal end 24 to outlet end 22 for flume 12 with a slope of 1% is roughly four inches. With such a minimal drop off there is no need to cut into floor 16 to position flume 12 underneath sections 18. In essence, flume 12 can be mounted at waist level below machine sections 18. Thus, machine sections 18 do not need to be raised to accommodate flume 12.

Filtration apparatus 14 filters the dirty coolant from flume 12 to remove the particulate contained therein. For example, filtration apparatus 14 may be similar to the filtration apparatus disclosed in U.S. Pat. Nos. 4,761,226 and 4,715,964. The '226 and '964 patents are assigned to the assignee of the present invention and are incorporated in their entirety herein by reference.

Filtration apparatus 14 includes a dirty tank 28 and a clean tank 30 separated by a filter medium 32 such as a perforate filter membrane. Filter medium 32 separates the particulate from the coolant. Consequently, dirty tank 28 contains dirty coolant and clean tank 30 contains clean coolant. Clean tank 30 includes a clean pump 34. Clean pump 34 draws coolant through filter medium 32 discharging part of the coolant into clean tank 30.

Clean pump 34 also pumps filtered clean coolant to machine sections 18 through a discharge header 36. Discharge header 36 includes a plurality of discharge ports 38 which branch off from the discharge header and are in fluid communication with machine sections 18. Machine sections 18 use the clean coolant for cooling and flushing away particulate generated by the machining operation. After use, machine sections 18 discharge dirty coolant containing particulate out of machine outlets 20 and into flume 12 to repeat the recirculation process.

Filtration system 10 may include diverter plates 39 disposed adjacent machine outlets 20. Diverter plates 39 divert the fall of dirty coolant from machine outlets 20 from a generally vertical direction to a transverse direction in the direction generally toward outlet end 22 of flume 12. Diverter plates 39 act to add a horizontal velocity component to the dirty coolant flowing within flume 12. Preferably, diverter plates 39 are positioned at a 45 degree angle with respect to flume 12.

Filtration system 10 further includes a discharge pipe 40 mounted adjacent distal end 24 of flume 12. Pipe 40 may be similar to the flush nozzle disclosed in U.S. Pat. No. 5,086,795 assigned to the assignee of the present invention. The '795 patent is incorporated in its entirety herein by reference.

Pipe 40 is connected to a discharge port 42 of discharge header 36 to continuously receive a flow of clean coolant from filtration apparatus 14. Pipe 40 introduces a stream of clean coolant into flume 12 in a direction generally toward outlet end 22. The stream increases the volume of coolant at distal end 24 which causes the hydraulic radius of flume 12 to increase to an efficient hydraulic radius such that a minimal amount of coolant flows within the flume at a sufficient velocity to wash away the particulate from the flume into filtration apparatus 14. Because of the increased hydraulic radius, the velocity of the coolant can be increased to the sufficient velocity even though the slope of flume 12 is on the order of less than 2%.

As a result, the build up of particulate in flume 12 is prevented. Furthermore, filtration apparatus 14 conserves energy because only the minimal amount of coolant is filtered. Additionally, clean pump 34 conserves energy because only the minimal amount of coolant is pumped to machine sections 18 and pipe 40.

Filtration system 10 is used for machining or grinding operations in which machine sections 18 receive and output upwards of 1000 gallons of coolant per minute. Thus, the amount of coolant supplied to pipe 40 is a minimal amount such that only the amount of coolant required for washing away the particulate is supplied to the pipe. For instance, the amount of coolant supplied to pipe 40 may be 600 gallons per minute. It is important to supply pipe 40 with the minimal amount of coolant needed for maintaining the sufficient velocity of the coolant because the amount of work performed by filtration apparatus 14 and clean pump 34 is proportional to the amount of recirculated coolant.

Referring now to FIG. 2, an alternative embodiment of a filtration system 50 is shown. Filtration system 50 includes many of the same elements as filtration system 10 of FIG. 1. Accordingly, these elements have the same reference numerals. Filtration system 50 differs from filtration system 10 in that dirty tank 28 includes a dirty pump 52. Dirty pump 52 pumps unfiltered dirty coolant from dirty tank 28 to pipe 40 through a discharge pipe discharge header 54. Pipe 40 then introduces a stream of dirty coolant into flume 12. The stream increase the volume of coolant at distal end 24 which causes the hydraulic radius of flume 12 to increase to an efficient hydraulic radius such that a minimal amount of coolant flows within the flume at a sufficient velocity to wash away the particulate from the flume into filtration apparatus 14.

The dirty coolant supplied to pipe 40 does not plug the pipe with particulate because the pipe introduces the stream of dirty coolant at a relatively low velocity. Pipe 40 is also relatively large having a diameter on the order of 1½ to 3 inches. The advantage of filtration system 50 over filtration system 10 is that less coolant needs to be filtered by filtration apparatus 14 because pipe 40 is receiving dirty coolant. Thus, filtration apparatus 14 may be more compact and efficient because it is only filtering and cleaning the coolant required for operation of machine sections 18.

Referring now to FIG. 3, another alternative embodiment of a filtration system 60 is shown. Filtration system 60 includes many of the elements introduced before and these elements have the same reference numerals. Filtration system 60 also includes a flushing controller 61. Flushing controller 61 has an input 64 coupled to discharge header 36. Flushing controller 61 also has a discharge pipe output 66 connected to pipe 40 by a discharge pipe discharge header 68. Flushing controller 61 further has a machine output 70 connected to machine sections 18 by a machine header 72 and individual discharge ports 38.

Clean pump 34 pumps filtered clean coolant from clean tank 30 to flushing controller 61. Flushing controller 61 includes a valve 74 for selectively controlling the flow of coolant to machine sections 18 and pipe 40. Flushing controller 61 controls valve 74 to let all of the clean coolant flow to machine sections 18 for machining operations while preventing any of the clean coolant from flowing to pipe 40. During the machining cycle, pipe 40 is tranquil and is introducing little or no coolant into flume 12. Thus, the only coolant entering flume 12 is the dirty coolant falling from machine outlets 20. This coolant has a low flow velocity in flume 12 because the slope of the flume and diverter plates 39 are mainly the only factors contributing to the velocity. Consequently, the velocity of the coolant flowing within flume 12 is relatively low and the particulate may accumulate in the flume.

Flushing controller 61 periodically diverts at least a portion of the flow of clean coolant from clean pump 34 to pipe 40 to intermittently flush flume 12 in accord with the intermittent waste flushing method described in U.S. Pat. No. 4,655,940. The '940 patent is assigned to the assignee of the present invention and is incorporated in its entirety herein by reference. The periodic diversion of the clean coolant occurs when the machining operations have temporarily ceased and the parts in the machines are being sequenced to the next stations. Thus, when the parts are being sequenced, flushing controller 61 controls valve 74 to divert the flow of clean coolant to pipe 40. The additional volume of coolant in the stream at distal end 24 causes the coolant flowing within flume 12 to increase to the sufficient velocity. The additional volume of the stream also causes the hydraulic radius of the flume to increase to the efficient hydraulic radius. Thus, a minimal amount of coolant flows within the flume to wash away the particulate from the flume into filtration apparatus 14.

For instance, during machining, the flow velocity of coolant flowing in the flume may be four feet per second. For some types of particulate this velocity may be inadequate to wash away the particulate. When the flow of coolant is diverted to pipe 40, an increased volume of coolant at an increased pressure is introduced at distal end 24 of flume 12. This causes the velocity of coolant flowing within flume 12 and the hydraulic radius of the flume to increase. Thus, the velocity of coolant flowing in flume 12 may rise from four to six feet per second which may be adequate to wash away the particulate.

In another alternative embodiment, pipe 40 continuously introduces a minimal stream of coolant into flume 12. The minimal stream is sufficient to keep flume 12 from flooding due to buildup of particles. Periodically, at least a portion of the coolant supplied to machine sections 18 is diverted to pipe 40 to introduce a larger stream at a higher pressure sufficient to wash away all of the particulate from flume 12.

Filtration system 60 may include a storage container 96 located above or adjacent to filtration apparatus 14. Storage container 96 may be filled by diverting a small flow of clean coolant from clean pump 34. Storage container 96, or an additional storage container, may also be filled with dirty coolant from dirty tank 28 to prevent overflow of the dirty tank. Storage container 96 may supply this coolant by opening a valve (not specifically shown) to flow into dirty tank 28 to prevent vortexing. Storage container 96 can be separated or incorporated into clean tank 30.

Referring now to FIG. 4, a cross-sectional view of flume 12 is shown. Flume 12 includes a flat bottom portion 76 connected to opposed angular wall portions 78 and 80. Upright portions 82 and 84 are connected to respective angular wall portions 78 and 80. Flume 12 approximates a round bottom flume. Thus, flume 12 has nearly the hydraulic radius characteristics of a round bottom flume.

Referring now to FIG. 5, a cross-sectional view of a prior art U-shaped flume 90 is shown. Because of the U-shape, particulate 92 carried by the dirty coolant accumulates and settles towards the bottom of flume 90. Particulate 92 bunches up together and impedes its progress to flow along flume 90. As a result, the particles in particulate 92 have to flow over top of each other to move along flume 90.

Thus, a greater coolant flow velocity is needed to move particulate 92 from one end of flume 90 to the other. With a greater flow velocity, more coolant is needed to be filtered and pumped resulting in less efficient operation. Furthermore, with a greater required flow velocity, the slope of flume 90 needs to be increased for a given hydraulic radius. Because of the increased slope flume 90 may need to be installed in the floor to fit underneath the machine sections without raising the sections. Finally, losses associated with friction of flume 90 increase because they are proportional to the square of the velocity of the coolant at a specific hydraulic radius.

In contrast, as shown in FIGS. 4 and 6, flume 12 is designed to minimize the amount of coolant needed to wash away the particulate by spreading out and dispersing particulate 94 across flat bottom 76. As a result of the dispersion, particles of particulate 94 have their own space and do not impede each others progress to flow along flume 12. Thus, a lower coolant flow velocity may move particulate 94 from one end of flume 12 to the other.

As stated above, flume 12 closely approximates a round bottom flume. Thus, the hydraulic radius of flume 12 increases proportionally to the amount of coolant flowing within flume 12. The hydraulic radius of flume 12 increases to the efficient hydraulic radius when the stream of coolant is introduced into flume such that a minimal amount of coolant flows within the flume at a sufficient velocity. The losses associated with friction of flume 12 are lowered because they are inversely proportional to the hydraulic radius.

In essence, flume 12 is designed such that it has an efficient hydraulic radius conducive for dispersing particulate 94 so that a minimal amount of coolant flowing at the sufficient velocity can wash away the particulate. Consequently, filter 14 and pumps 34 and 52 work efficiently at the minimum required size.

Referring now to FIG. 7, a cross-sectional view of another embodiment of a flume 100 of the present invention is shown. Flume 100 includes a rounded bottom 102 and opposed wall portions 104 and 106. Like flume 12, flume 100 has a shape conducive for to spread out and disperse the particulate for permitting an efficient hydraulic radius so that the velocity of the coolant flowing within the flume increase to the sufficient velocity when the stream of coolant is introduced into the flume by pipe 40.

Instead of the single point intermittent flush used by filtration system 60, another embodiment of a filtration system uses multiple point flush (not specifically shown). In this embodiment, a plurality of discharge pipes are located at spaced intervals along flume 12. The discharge pipes are configured to discharge different streams of coolant into flume 12 to flush the flume during the flushing cycle. Instead of the high volume, low pressure coolant stream used in single point flushing, the multiple point flushing uses low volume, high pressure coolant streams.

For example, in single point flushing, pipe 40 may discharge 600 gallons of coolant at 3 pounds per square inch during the flush cycle. In contrast, in multiple point flushing, at least a couple of discharge pipes may discharge 100 gallons of coolant at 30 pounds per square inch. These discharge pipes are preferably placed at an optimum angle to force coolant to flow in a flume even if the flume has little or no slope. Accordingly, the flume can fit above the floor within an in-line machine section.

Figure 8:
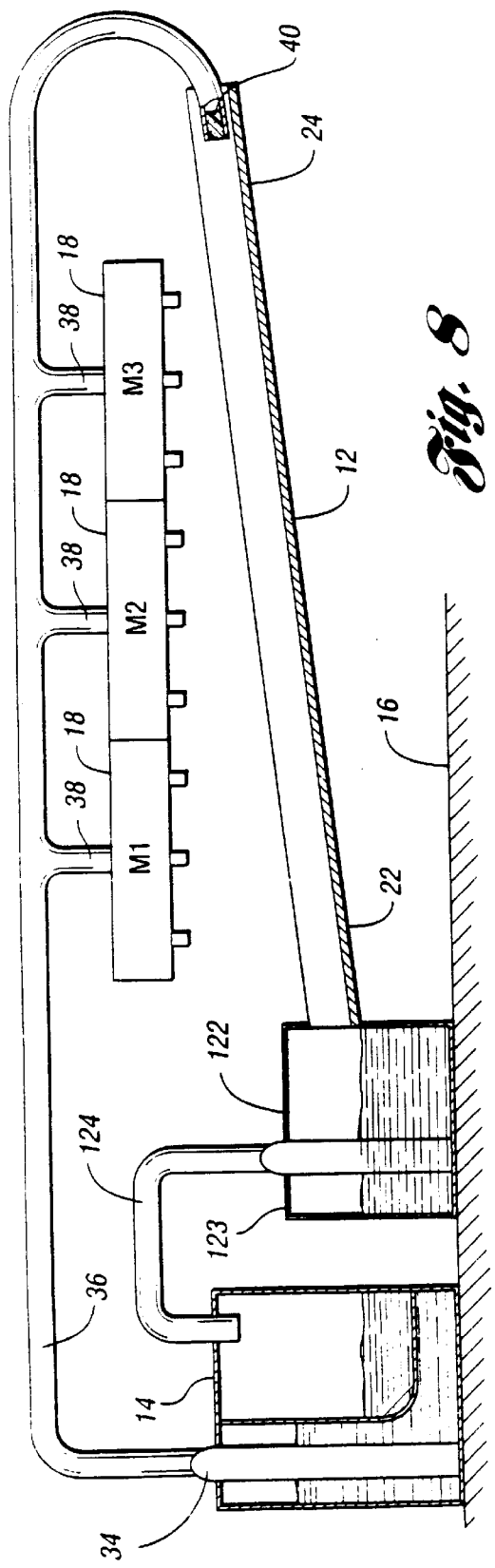
FIG. 8 is a schematic illustration of a further embodiment of the present invention.
Figure 9:
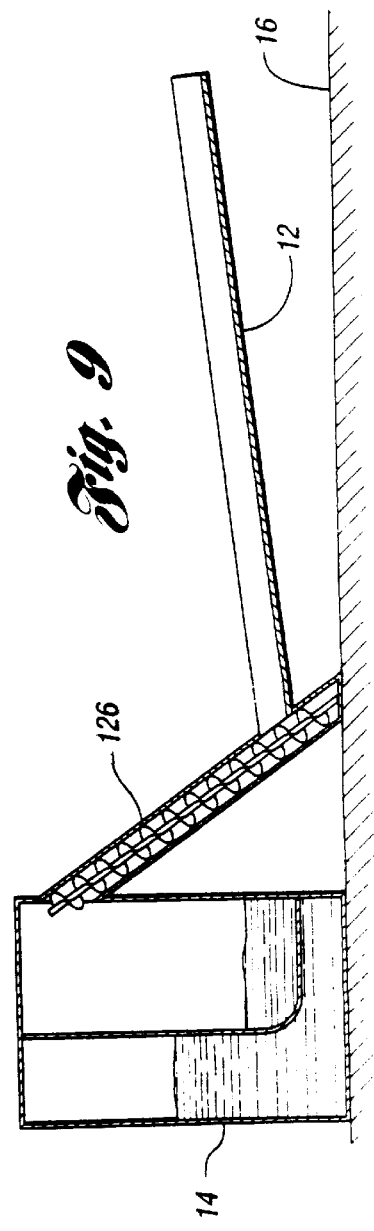
FIG. 9 illustrates a modification to the embodiment shown in FIG. 8.

Referring now to FIGS. 8 and 9, filtration systems 10, 50, and 60 may be modified by transporting coolant from outlet end 22 of flume 12 up to filtration apparatus 14. This enables filtration apparatus 14 to filter and hold more coolant without causing coolant backstreaming. Backstreaming occurs when the height of coolant in filtration apparatus 14 above floor 16 exceeds the height of flume outlet ends mounted into the side of the filtration apparatus.

Different devices may be used to move the coolant from outlet end 22 up to filtration apparatus 14. For instance, as shown in FIG. 8, a sump 122 having a lifting pump 123 may pump the coolant through a header 124 up to filtration apparatus 14. Sump 122 is above floor 16, but may be installed underneath the floor. Because filtration apparatus 14 can handle more coolant without causing backstreaming, other flumes from other machine sections may fill the same filtration apparatus with coolant. In turn, filtration apparatus 14 is a central filtration apparatus.

As shown in FIG. 9, an elevated auger 126 may be operable with outlet end 22 of flume 12 for moving the coolant up into the filtration apparatus 14. If desired, a pump and a sump may be operable with auger 126 to pump the coolant up into filtration apparatus 14.

Thus, it is apparent that there has been provided, in accordance with the present invention, a floor mounted filtration system that fully satisifies the objects, aims, and advantages set forth above.

While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A flume system for use with a floor mounted filtration apparatus and a floor mounted in-line machine section which receives a flow of clean coolant from the filtration apparatus and has a series of machine outlets for outputting dirty coolant carrying particulate generated by the machine section, the system comprising:

an elongated flume having an outlet end and a distal end, the distal end spaced transversely from and oriented above the outlet end so that the flume has a slope of less than 2%, the outlet end coupled to an inlet end of the filtration apparatus, wherein the flume is mounted above the floor and disposed adjacent the series of machine outlets to receive the dirty coolant carrying the particulate; and a discharge pipe mounted adjacent the distal end of the flume for introducing a stream of coolant into the flume in a direction generally toward the outlet end, wherein the stream of coolant introduced into the flume causes the flume to have an efficient hydraulic radius such that a minimal amount of coolant flows within the flume at a sufficient velocity to wash away the particulate from the flume into the filtration apparatus.

2. The system of claim 1 further comprising:

means for periodically diverting at least a portion of the flow of clean coolant from the machine section to the discharge pipe for introducing the stream of coolant into the flume.

3. The system of claim 2 further comprising:

a flushing controller operable with the filtration apparatus, the machine section, and the discharge pipe, wherein the flushing controller periodically diverts the flow of clean coolant to the discharge pipe.

4. The system of claim 1 wherein:

means for continuously providing a flow of coolant from the filtration apparatus to the discharge pipe for introducing the stream of coolant into the flume.

5. The system of claim 4 wherein:

the flow of coolant from the filtration apparatus to the discharge pipe is filtered.

6. The system of claim 4 wherein:

the flow of coolant from the filtration apparatus to the discharge pipe is unfiltered.

7. The system of claim 1 wherein:

the series of machine outlets are oriented so that the machine outputted dirty coolant falls down under gravity into the flume.

8. The system of claim 7 further comprising:

a diverter plate disposed underneath at least one of the series of machine outlets to divert the fall of the machine outputted dirty coolant transversely into the flume in the direction of the coolant flowing within the flume.

9. The system of claim 1 wherein:

the flume includes a bottom and opposed wall portions connected to the bottom.

10. The system of claim 1 wherein:

the bottom and the wall portions form a shape conducive for permitting the efficient hydraulic radius so that the velocity of the coolant flowing within the flume increases to the sufficient velocity when the stream of coolant is introduced into the flume.

11. A flume system for use with a floor mounted filtration apparatus and a floor mounted in-line machine section which receives a flow of clean coolant from the filtration apparatus and has a series of machine outlets for outputting dirty coolant carrying particulate, the system comprising:

an elongated flume having an outlet end and a distal end, the distal end spaced transversely from and oriented above the outlet end so that the flume has a slope of less than 2%, the outlet end coupled to an inlet end of the filtration apparatus, wherein the flume is mounted above the floor and disposed adjacent the series of machine outlets to receive the dirty coolant carrying the particulate; and a discharge pipe mounted adjacent the distal end of the flume for introducing a stream of coolant into the flume in a direction generally toward the outlet end, wherein at least a portion of the flow of clean coolant is periodically diverted to the discharge pipe to cause the flume to have an efficient hydraulic radius such that a minimal amount of coolant flows within the flume at a sufficient velocity to wash away the particulate from the flume into the filtration apparatus.

12. The system of claim 11 wherein:

the flume includes opposed wall portions connected to a bottom, wherein the opposed wall portions and the bottom form a shape conducive for permitting the efficient hydraulic radius so that the velocity of the coolant flowing within the flume increases to the sufficient velocity when the stream of coolant is introduced into the flume.

13. A flume system for use with a floor mounted filtration apparatus and a floor mounted in-line machine section which receives a flow of clean coolant from the filtration apparatus and has a series of machine outlets for outputting dirty coolant carrying particulate, the system comprising:

an elongated flume having an outlet end and a distal end, the distal end spaced transversely from and oriented above the outlet end so that the flume has a slope of less than 2%, the outlet end coupled to an inlet end of the filtration apparatus, wherein the flume is mounted above the floor and disposed adjacent the series of machine outlets to receive the dirty coolant carrying the particulate; and a discharge pipe mounted adjacent the distal end of the flume for introducing a stream of coolant into the flume in a direction generally toward the outlet end, wherein the discharge pipe continuously receives a flow of coolant from the filtration apparatus to cause the flume to have an efficient hydraulic radius such that a minimal amount of coolant flows within the flume at a sufficient velocity to wash away the particulate from the flume into the filtration apparatus.

14. The system of claim 13 wherein:

the flume includes opposed wall portions connected to a bottom, wherein the opposed wall portions and the bottom form a shape conducive for permitting the efficient hydraulic radius so that the velocity of coolant flowing within the flume is maintained at the sufficient velocity while the stream of coolant is introduced into the flume.

15. The system of claim 13 wherein:

the flow of coolant from the filtration apparatus to the discharge pipe is filtered.

16. The system of claim 13 wherein:

the flow of coolant from the filtration apparatus to the discharge pipe is unfiltered.

17. A filtration system for use with a floor mounted in-line machine section having a series of machine outlets for outputting dirty coolant carrying particulate, the system comprising:

an elongated flume having an outlet end and a distal end, the distal end spaced transversely from and oriented above the outlet end so that the flume has a slope of less than 2%, the outlet end coupled to an inlet end of the filtration apparatus, wherein the flume is mounted above the floor and disposed adjacent the series of machine outlets to receive the dirty coolant carrying the particulate;

a floor mounted filtration apparatus for filtering the machine outputted dirty coolant to remove the particulate therefrom and supply the machine with a flow of clean coolant; and a discharge pipe mounted adjacent the distal end of the flume for introducing a stream of coolant into the flume in a direction generally toward the outlet end, wherein the stream of coolant introduced into the flume causes the flume to have an efficient hydraulic radius such that a minimal amount of coolant flows within the flume at a sufficient velocity to wash away the particulate from the flume into the filtration apparatus.

18. The system of claim 17 wherein:

at least a portion of the flow of clean coolant to the machine section is periodically diverted to the discharge pipe for introducing the stream of coolant into the flume.

19. The system of claim 18 wherein:

the flume includes opposed wall portions connected to a bottom, wherein the opposed wall portions and the bottom form a shape conducive for permitting the efficient hydraulic radius so that the velocity of the coolant flowing within the flume increases to the sufficient velocity when the stream of coolant is introduced into the flume.

20. The system of claim 18 further comprising:

a clean pump associated with the filtration apparatus, wherein the clean pump pumps the flow of clean coolant from the filtration apparatus to the machine section.

21. The system of claim 20 further comprising:

a flushing controller operable with the clean pump, the machine section, and the discharge pipe, wherein the flushing controller periodically diverts at least a portion of the flow of clean coolant from the machine to the discharge pipe.

22. The system of claim 17 wherein:

the discharge pipe continuously receives a flow of coolant from the filtration apparatus for introducing the stream of coolant into the flume.

23. The system of claim 22 wherein:

the flume includes opposed wall portions connected to a bottom, wherein the opposed wall portions and the bottom form a shape conducive for permitting the efficient hydraulic radius so that the velocity of coolant flowing within the flume is maintained at the sufficient velocity while the stream of coolant is introduced into the flume.

24. The system of claim 22 wherein:

the flow of coolant received by the discharge pipe from the filtration apparatus is unfiltered, the system further comprising a dirty pump associated with the filtration apparatus, wherein the dirty pump pumps the unfiltered coolant from the filtration apparatus to the discharge pipe.

25. The system of claim 22 wherein:

the flow of coolant received by the discharge pipe from the filtration apparatus is filtered, the system further comprising a clean pump associated with the filtration apparatus, wherein the clean pump pumps the filtered coolant from the filtration apparatus to the discharge pipe.

26. The system of claim 17 further comprising:

a storage container coupled to the filtration apparatus for containing coolant, wherein the storage container receives and stores coolant from the filtration apparatus to prevent overflow of the coolant in the filtration apparatus.

27. The system of claim 17 further comprising:

a storage container coupled to the filtration apparatus for containing coolant, wherein the storage container provides an outflow coolant to the filtration apparatus to prevent vortexing of the dirty coolant in the filtration apparatus.

28. An apparatus for use with a floor mounted filtration apparatus and a floor mounted in-line machine section which receives a flow of clean coolant from the filtration apparatus and has a series of machine outlets for outputting dirty coolant carrying particulate generated by the machine section, the apparatus comprising:

an elongated flume having an outlet end and a distal end, the distal end spaced transversely from and oriented above the outlet end so that the flume has a slope of less than 2%, the outlet end coupled to an inlet end of the filtration apparatus, the flume is mounted above the floor and disposed adjacent the series of machine outlets to receive the dirty coolant carrying the particulate, wherein the flume includes opposed wall portions connected to a bottom forming a shape conducive for permitting an efficient hydraulic radius of the flume so that a minimal amount of coolant flowing within the flume flows at a sufficient velocity to wash away the particulate therefrom into the filtration apparatus.

29. The apparatus of claim 28 wherein:

the bottom of the flume is flat.

30. The apparatus of claim 28 wherein:

the bottom of the flume is rounded.

31. A flume system for use with a floor mounted central filtration apparatus and a floor mounted in-line machine section which receives a flow of clean coolant from the filtration apparatus and has a series of machine outlets for outputting dirty coolant carrying particulate generated by the machine section, the system comprising:

an elongated flume having an outlet end and a distal end, the distal end spaced transversely from and oriented above the outlet end so that the flume has a slope of less than 2%, wherein the flume is mounted above the floor and disposed adjacent the series of machine outlets to receive the dirty coolant carrying the particulate;

a lifting pump operable with the outlet end of the flume and the filtration apparatus for moving coolant from the flume into the filtration apparatus; and a discharge pipe mounted adjacent the distal end of the flume for introducing a stream of coolant into the flume in a direction generally toward the outlet end, wherein the stream of coolant introduced into the flume causes the flume to have an efficient hydraulic radius such that a minimal amount of coolant flows within the flume at a sufficient velocity to wash away the particulate from the flume into the filtration apparatus.

32. The system of claim 31 further comprising:

a sump interposed between the outlet end of the flume and the lifting pump.

33. The system of claim 31 further comprising:

an elevated auger interposed between the outlet end of the flume and the sump.

34. The system of claim 31 wherein:

the flume includes opposed wall portions connected to a bottom, wherein the opposed wall portions and the bottom form a shape conducive for permitting the efficient hydraulic radius so that the velocity of the coolant flowing within the flume increases to the sufficient velocity when the stream of coolant is introduced into the flume.

35. A flume system comprising a flume containing and transporting dirty particulate laden coolant received from a machine, wherein the flume comprises:

an outlet end for discharging said particulate laden coolant;

a distal end, the distal end spaced transversely from and oriented above the outlet end so that the flume has a slope of less than 2%;

opposed wall portions; and a bottom connecting the opposed wall portions, wherein the wall portions and the bottom form a shape conducive for permitting an efficient hydraulic radius such that a minimal amount of coolant flows within the flume at a sufficient velocity to wash away the particulate from the flume into the filtration apparatus.

* * * * *